(12) United States Patent
Chierego et al.

(10) Patent No.: US 9,688,477 B2
(45) Date of Patent: Jun. 27, 2017

(54) METHOD AND DEVICE FOR DRIVING PARCEL SORTERS FOR INSTALLATIONS FACILITIES HAVING CONSIDERABLE CHANGES IN LEVELS

(71) Applicant: FIVES INTRALOGISTICS S.P.A., Lonate Pozzolo (IT)

(72) Inventors: Lorenzo Chierego, Varese (IT); Attilio Soldavini, Ferno (IT)

(73) Assignee: FIVES INTRALOGISTICS S.P.A., Lonate Pozzolo (IT)

( * ) Notice: Subject to any disclaimer, the term of this patent is extended or adjusted under 35 U.S.C. 154(b) by 0 days.

(21) Appl. No.: 15/117,385

(22) PCT Filed: Feb. 11, 2015

(86) PCT No.: PCT/EP2015/052882
§ 371 (c)(1),
(2) Date: Aug. 26, 2016

(87) PCT Pub. No.: WO2015/121306
PCT Pub. Date: Aug. 20, 2015

(65) Prior Publication Data
US 2016/0355349 A1 Dec. 8, 2016

(30) Foreign Application Priority Data
Feb. 11, 2014 (FR) ..................... 14 00380

(51) Int. Cl.
*B65G 47/46* (2006.01)
*B65G 43/08* (2006.01)
(Continued)

(52) U.S. Cl.
CPC ............... *B65G 23/36* (2013.01); *B07C 3/08* (2013.01); *B65G 43/08* (2013.01); *B65G 47/96* (2013.01);
(Continued)

(58) Field of Classification Search
CPC .... B65G 47/962; B65G 47/965; B65G 47/38; B65G 47/42; B65G 47/96; B65G 17/42; B61B 13/12
(Continued)

(56) References Cited

U.S. PATENT DOCUMENTS 3,528,539 A * 9/1970 Speaker ................. B65G 47/61
104/89
3,679,045 A * 7/1972 Morgan ............... B65G 17/126
198/370.05
(Continued)

FOREIGN PATENT DOCUMENTS

EP 1352859 A2 10/2003

*Primary Examiner* — James R. Bidwell
(74) *Attorney, Agent, or Firm* — Pearne & Gordon LLP

(57) ABSTRACT

The present invention concerns a method and system for sorting items comprising movable carriages (10) intended to transport the items, and connected to each other by a link (19), along a track having sections located at levels at different heights linked by ascending and descending slopes, a control system and drive units intended to move the carriages (10). Dedicated thrust units, separate from the drive units, are added on the slopes and are controlled individually by the control system so as to deliver a constant force in order to prevent the carriages (10) experiencing tension at the links (19, 20) as a result of the weight of the items and/or the carriages (10) present on the slopes.

12 Claims, 14 Drawing Sheets

(51) Int. Cl.
  *B65G 23/36*   (2006.01)
  *B65G 47/96*   (2006.01)
  *G05B 19/418*  (2006.01)
  *B07C 3/08*    (2006.01)

(52) U.S. Cl.
  CPC .. *G05B 19/4189* (2013.01); *B65G 2203/0258* (2013.01); *Y02P 90/28* (2015.11)

(58) Field of Classification Search
  USPC ............ 198/370.01, 370.04, 370.05, 371.2; 104/178, 187, 190
  See application file for complete search history.

(56) References Cited

U.S. PATENT DOCUMENTS

| | | | | |
|---|---|---|---|---|
| 4,031,998 A * | 6/1977 | Suzuki | ................ | B65G 47/962 198/370.04 |
| 6,276,510 B1 * | 8/2001 | Lavars | ................ | B65G 47/962 198/370.04 |
| 6,829,999 B2 | 12/2004 | Soldavini et al. | | |
| 2003/0217909 A1 | 11/2003 | Soldavini et al. | | |
| 2004/0232056 A1 * | 11/2004 | Groot | ................ | B65G 47/962 198/370.04 |
| 2005/0274589 A1 * | 12/2005 | Groot | ................ | B65G 17/066 198/370.04 |
| 2006/0260908 A1 * | 11/2006 | Affaticati | ............ | B65G 47/962 198/370.04 |
| 2008/0234858 A1 | 9/2008 | Dollens et al. | | |
| 2014/0014468 A1 | 1/2014 | Pilarz et al. | | |

* cited by examiner

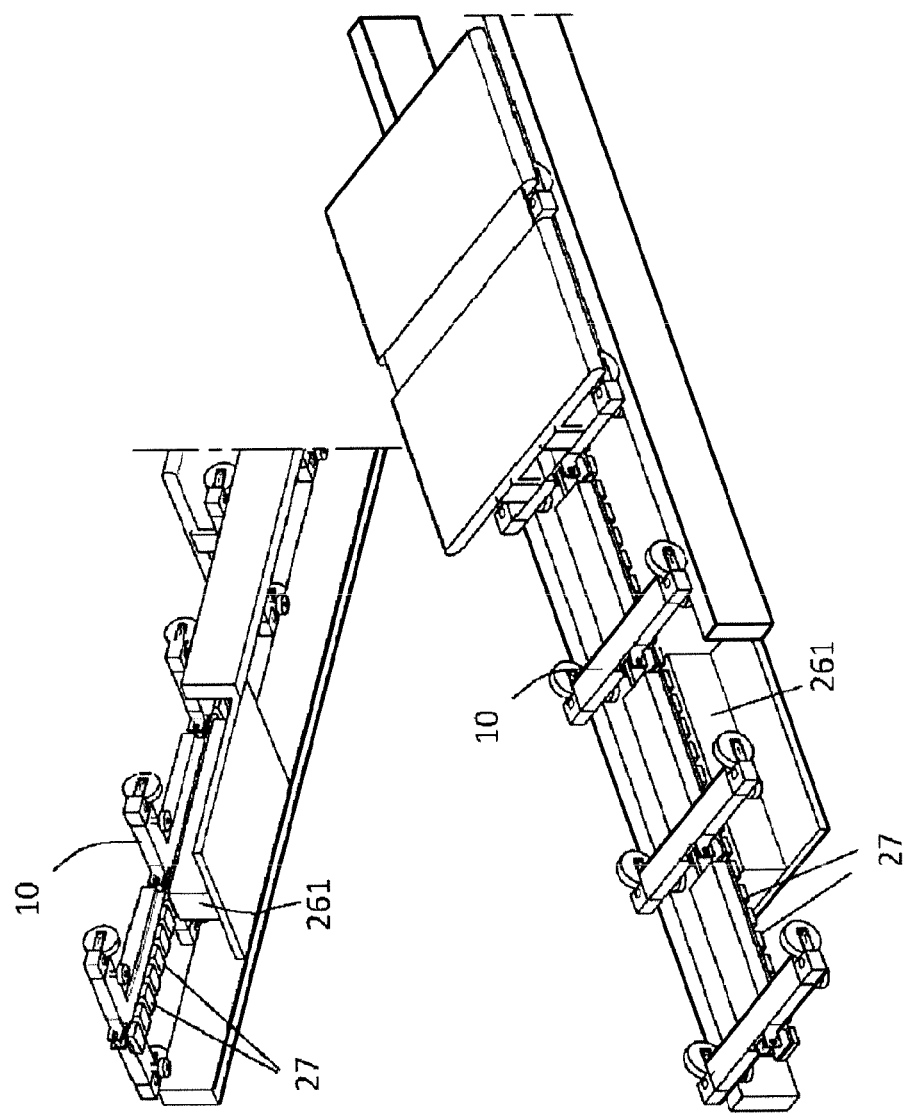

METHOD AND DEVICE FOR DRIVING PARCEL SORTERS FOR INSTALLATIONS FACILITIES HAVING CONSIDERABLE CHANGES IN LEVELS

The invention relates to the field of equipment intended for sorting items through sorting machines, and more particularly those equipped with cross belt carriages, called cross-belt, or with tilting trays, called tilt-trays.

Sorting machines for parcels and packages consist of carriages connected together in a linked manner to form a train that circulates in a loop on a path constituting a circuit. In general, the sorting machine completely occupies the circuit on which it travels, and is itself thus also closed in a loop, forming a chain where the links are constituted by carriages, at regular intervals. In particular, these sorting machines are used in the sector of distribution, to prepare orders intended for retail outlets or directly for customers.

They are also used in the sector of post offices and couriers for sorting parcels and packages, and these are the sectors that are the most interesting for the present invention. In particular, the sector of express couriers, because of the wider range of handled items, the great capacity required with the weight of items being able to go up to 50 kg and the movement speeds of the carriages being able to reach 3 m/s, and because of the long and complex paths of the sorting machines.

These paths of the sorting machines are necessary to serve the loading and unloading doors of the means of transport, and often also specific work surfaces, for example for X-ray checks of the packages or for customs inspections.

The two most widespread technologies for sorting machines are cross-belt technology and tilt-tray technology. Each carriage is provided with a sorting unit. The latter consists of a conveyor that is orthogonal to the movement sense of the machine if the sorting machines are of the cross-belt type. The sorting unit takes the form of tilt-trays if the sorting machines are of the tilt-tray type.

A sorting machine of cross-belt type is for example disclosed in document US 2014/0014468.

The orthogonal conveyor is activated during receipt of the object to be sorted and during sorting at destination. The tilt-tray is loaded with the object to be conveyed, then it tips at the destination for sorting the object.

Along the path there are stations for automatic loading of the objects to be sorted, and collecting devices for collecting the sorted objects, in general gravity chutes for gathering the sorted objects in the same direction such as to optimise work downstream for dispatch.

Below, the reasons are briefly examined for which installations of sorting machines are often necessary that work on considerable changes in level, of the order of 8 meters or more, for which the present invention offers optimisation solutions of the size to increase the durability of the components and to lower operating costs.

In general, the installations of sorting equipment provide for sorting machines on a same plane, or with changes in level of the order of a few meters. In these cases, the loading level is at a lower height, at about 1 meter from the ground, for ergonomic reasons linked to the presence of the operators who manually load the objects to be sorted onto the automatic stations, removing the objects from crates or cages.

After the loading zones, the sorting machine generally ascends to about 3 meters from the ground, basically for two main reasons. The first reason is to enable the electric transpallets used for conveying bulky or very heavy packages, which cannot be handled by the sorting machine, to cross the building. The second reason is to be able to use simple gravity chutes to gather the sorted packages in such a manner as to limit the frequency of interventions by operators, whilst optimising work preparing for loading for dispatch, for example for loading the sorted packages into crates intended for means of transport.

There are nevertheless very important applications, for example in the large airport hubs of express couriers, where there have to be sorting machines that are capable of overcoming large differences in level, of more than 8 meters, to permit solutions that are suitable for the needs of different work zones and with superimposed storeys.

In these mechanised installations, it is necessary for the sorting machine to ensure height connections without harming movement on the ground of the embarked containers (loading units) to unload the packages to be sorted and to load the packages intended for flights. In addition, the sorting machine must not harm the movement of the transpallets for the connection between the unloading positions and the embarking positions for heavy and bulky packages that are not handleable by the sorting machine.

Further, in an installation of this type, there must be different specialised work zones for different tasks, which we shall briefly list. The inspection zones with the security X-ray machines: all the packages coming from the vehicles on the ground and intended for transport on aeroplanes must be closely checked with X-ray inspection machines of different degrees. For this, the sorting machine offers sorting and recovery solutions.

The X-ray inspection zones for customs controls and the manual customs inspection zones for the packages that are identified as having to pass through this control. Further, there exist temporary storage and recovery zones for packages containing special goods for which a direct specialised control has to be conducted or for which the customs authorisation is not yet available. In these cases, the sorting machine enables the identified packages to be diverted and distributed in the different workstations, to be parked temporarily and to automatically recover the freed packages.

Lastly, there are also manual work zones for repairing packages having damaged and illegible labels, or packages identified as having packing problems or being subjected to problems of stability and imprecision in loading onto the sorting machine.

All these work zones need large surfaces, for gathering the packages and for ergonomic reasons linked to the work of the operators. Practically, in order not to hinder maintenance on the ground, in general suspended mezzanines, and often on several parallel levels, are used one above the other. It is therefore necessary for the different levels to be served by the same sorting machine to sort and reload the packages, otherwise very complex solutions would have to be addressed.

The sorting machines used in these conditions of use are conceived around oversized drive elements for dealing with the heaviest parcels that are acceptable on the path of the travel route. This oversizing is economically disadvantageous because the drive elements are underused most of the time. This also has a not insignificant energy cost because of the electric power consumption of unsuitable large motors.

One of the major drawbacks of current sorting machines with large differences in level are due to the premature wear to the connecting members between the movable carriages. The different physical strains imposed by the changes in level and the weight of the items conveyed oblige the designers to oversize also the connecting members of the movable carriages. This oversizing of the connecting members thereby makes the carriages heavier, which contributes to oversizing a little more the drive motors of the chain.

For example, from document US 2008/0234858 a system is known for conveying the item on a conveying route on which certain drive members, arranged on the flat portions of the path, are controlled with adjustment of the torque according to the load weight and the angle of the ascending or descending slope.

With this type of system, the aforesaid drawbacks are found, namely the need to oversize the drive members to deal with the heaviest acceptable parcels on the path of the travel route, particularly on the sloped portions.

Further, in this type of configuration, the adjustment of the torque is linked to the drive speed of the complex.

The present invention thus intends in particular to alleviate the aforesaid drawbacks, by proposing equipment and a method enabling, in the slope zones, to limit the tensions and compressions that act and damage in the long term the coupling systems between the movable carriages. The present invention proposes solutions that enable sorting machines to be made in an optimised manner that are able to overcome considerable changes in level.

Thus the object of the invention, according to a first aspect, is a sorting system comprising movable carriages connected together by a link along a travel route of the sections to different height levels connected by ascent and descent slopes, a control system and drive units distributed along the travel route, controlled by the control system, and able to apply to the carriages forces varying as requested by the control system, preferably of the automatic speed adjustment type, so that the sorting machine has a constant and stable speed in different loading conditions.

In order to reduce or cancel the compression or traction forces acting on the carriages at the tilted sections, the present invention proposes adding along the tilted sections dedicated thrust units for applying constant forces on the carriages, regardless of the speed of the sorting system, to cancel the weight of the carriages on the tilted sections. In the simplest case, the force applied to the carriages is fixed according to the nominal weight of the carriage. The weight of the packages which are on the carriages is not considered because in most applications the weight of the items is negligible in relation to the weight of the carriage.

For applications with high item weights and/or very great height differences it can be justified to resort to a more complex solution where the control system requests each dedicated thrust unit on the tilted sections to apply a force value that cancels the actual weight of the carriages, which are at this moment on the sloped part, and which takes account of the weight of the parcels on these carriages.

According to certain embodiments, the sorting system further comprises one or more of the following features, which is (are) taken singly or following all the technically possible combinations:
  the dedicated thrust units are controlled by the control system so that the delivered force is adjusted according to the tilt of the slope;
  the sorting system has means suitable for determining the weight of the items placed on the movable carriages, and the dedicated thrust units are controlled by the control system so that the delivered force depends on said weight;
  the dedicated thrust units present on a slope of the travel route are equipped with an electromagnetically tripped braking system;
  the dedicated thrust units present on a slope of the travel route are equipped with motors having an electromagnetic brake;
  each dedicated thrust unit is able to apply a force to the carriage that can be determined individually by the control system. The dedicated thrust units can be friction or linear mechanisms without induction contact or linear mechanisms without synchronous contact.

The invention also relates, according to a second aspect, to a method for reducing the tension or compression acting on the carriages of an aforesaid item sorting system. Precisely, it is a method of item sorting by the system presented above in which: the control system determines the value of the force required for each dedicated thrust unit present on a slope and controls in a unitary manner the dedicated thrust unit, such that it delivers the force necessary for reducing or cancelling the tension or compression at the level of the links due to the tilt of the slope and to the weights of the carriages and/or of the items present on the slope.

According to certain embodiments, the method further comprises one or more of the following features, which is (are) taken singly or following all the technically possible combinations:
  to determine the value of the force required for each dedicated thrust unit present on a slope, each item (7) is assigned an average weight, determined statistically;
  to determine the value of the force required for the dedicated thrust units, the actual weight of the items placed on the carriages and determined by the means of determining the weight of these items is taken into account;
  to determine the value of the force required for the dedicated thrust units, the tilt of the slope is taken into account;
  the force calculated by the control system is either positive in the case of a slope with a positive tilt to limit traction on the links or negative in a slope with negative tilt to limit the pressure on the links;
  in the event of an interruption of the electric power supply to the dedicated thrust units, the activation of the electromagnetic brake of the dedicated thrust units on a slope cancels the tension or the compression on the links of the carriages present on this slope, thus preventing the movements of the machine forwards or backwards because of the unbalanced loads on the carriages.

The features and advantages of the invention will appear in the reading of the disclosure that will follow, which is given only by way of non-limiting example, with reference to the following appended Figures:

FIG. 14 is a representation of an implementation according to the invention with a second type of dedicated thrust units without contact; it comprises in the upper part a bottom view of a part of the equipment and, in the lower part, a top view of a part of the equipment.

In the following disclosure, we refer specifically to a sorting machine of the cross-belt type, but the present invention is also applicable to other types of sorting machines, notably those of the tilt-tray type.

Figure 1:
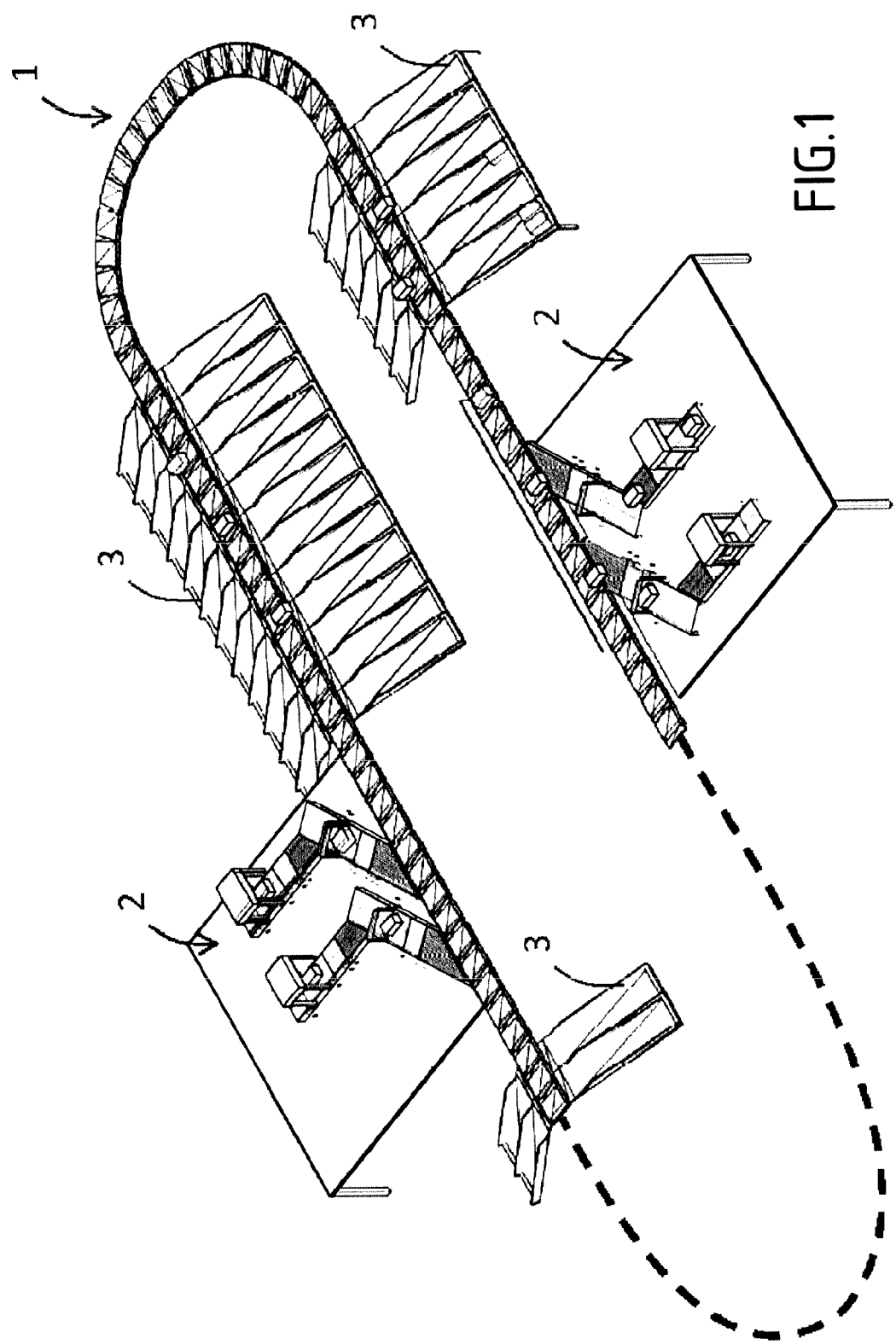
FIG. 1 is a schematic representation of a sorting system of cross-belt type.

FIG. 1 shows a part of a typical sorting installation of the cross-belt type. It comprises the sorting machine 1, automatic loading stations 2 to transfer the objects to be sorted onto orthogonal-belt carriages of the machine, and collecting chutes 3 of the objects sorted for the different destinations.

Figure 2:
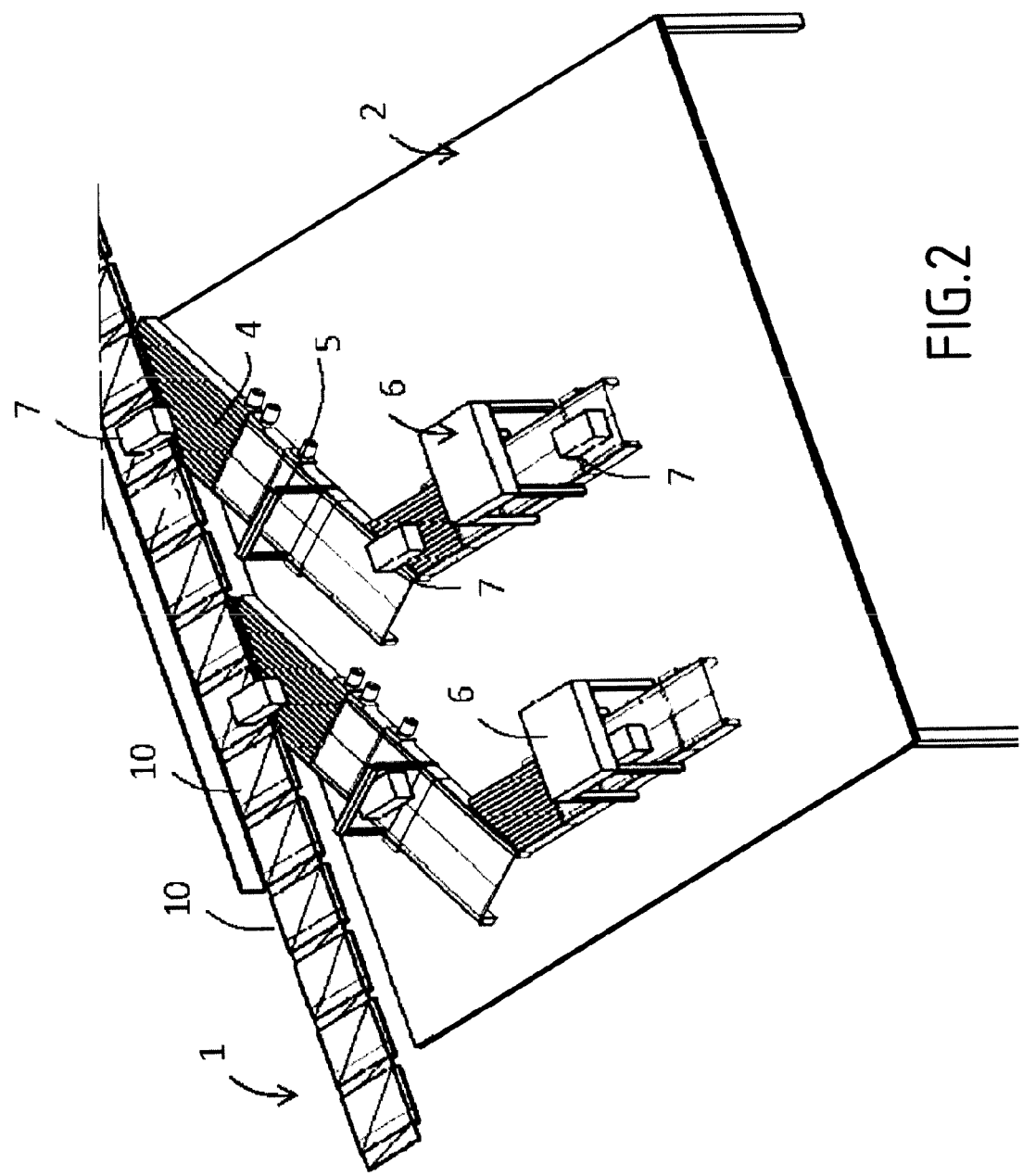
FIG. 2 is a schematic representation of a loading zone.

FIG. 2 shows in greater detail an example of automatic loading stations 2 provided for correctly orienting and for loading onto the carriages 10 the packages 7 arriving from unloading lines that are not represented. The stations 2 consist of controlled independent conveyor belts 4 to give each package 7 a trajectory that will lead it to be placed on the sorting unit 10 assigned thereto, where it will be loaded in a continuous movement without undergoing sudden deceleration. The trajectory of package loading is determined according to the information on the position, the dimension and the orientation of the package that are obtained owing to an optical scanning barrier 5.

In general, the station is provided with a system for identifying each package owing to a tunnel 6 equipped with laser scanners, or cameras, to detect the address label placed on the package. This comprises the barcode that enables each package to be identified and the sorting operations that arise therefrom. Very often the tunnel 6 comprises a conveyor belt that is capable of determining the weight of the object 7 in transit and a measuring system for measuring the volume thereof.

The tunnel 6 and in particular the conveyor belt thereof thus form an example of means permitting the weight of the conveyed object 7 to be determined.

Figure 3:
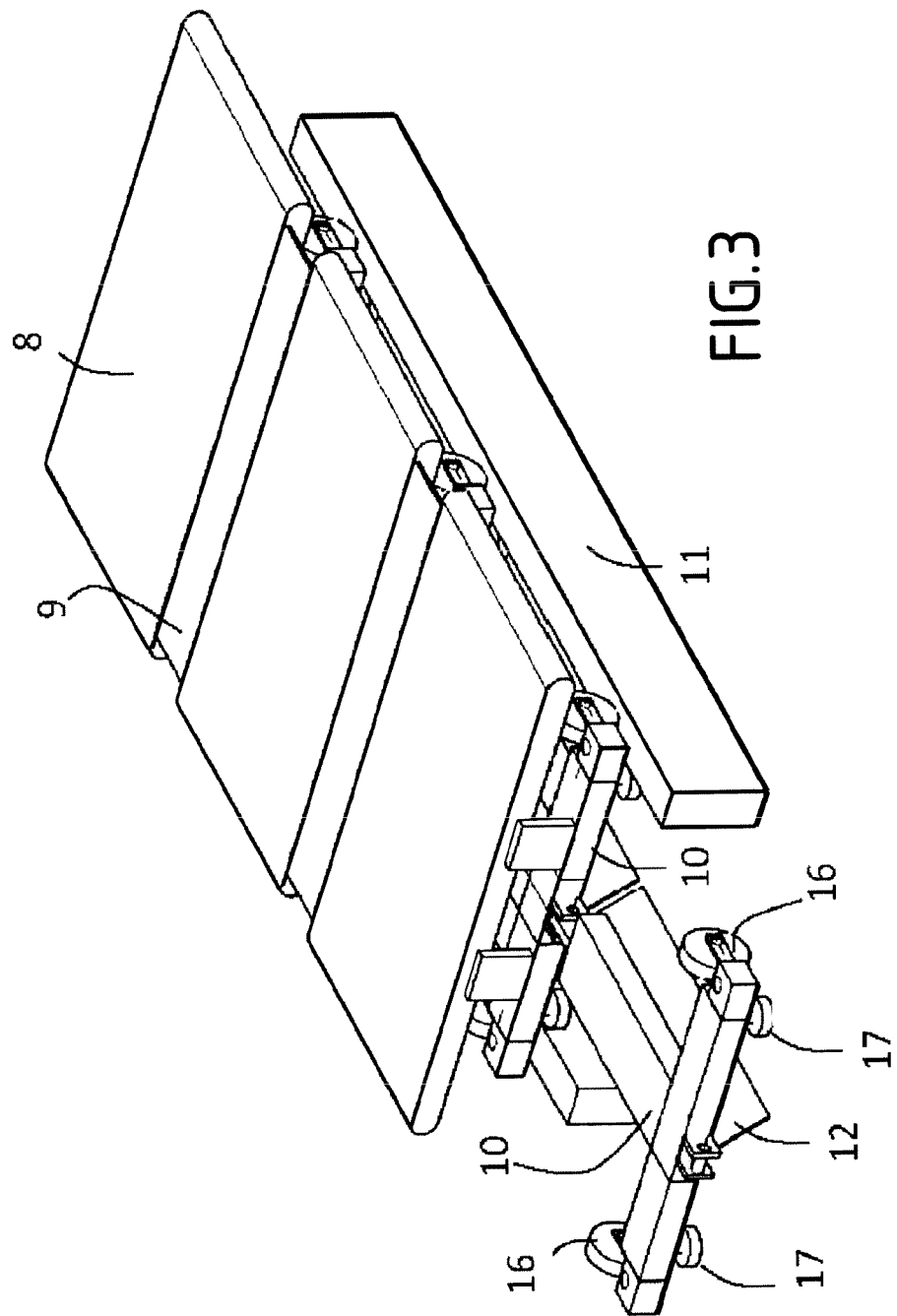
FIG. 3 is a schematic representation of movable carriages of cross-belt type.

FIG. 3 shows an example of a section of a cross-belt sorting machine. The carriages 10 travel on two parallel rails 11 owing to supporting castor wheels 16, whereas the inner side of the tracks 11 is used by the side guide wheels 17 to control the direction. The carriages 10 are provided with a vertical lamina 12 to receive the thrust of drive units, like those of the friction powertrains distributed along the path of the machine in order to keep the machine moving at operating speed.

Figure 7:
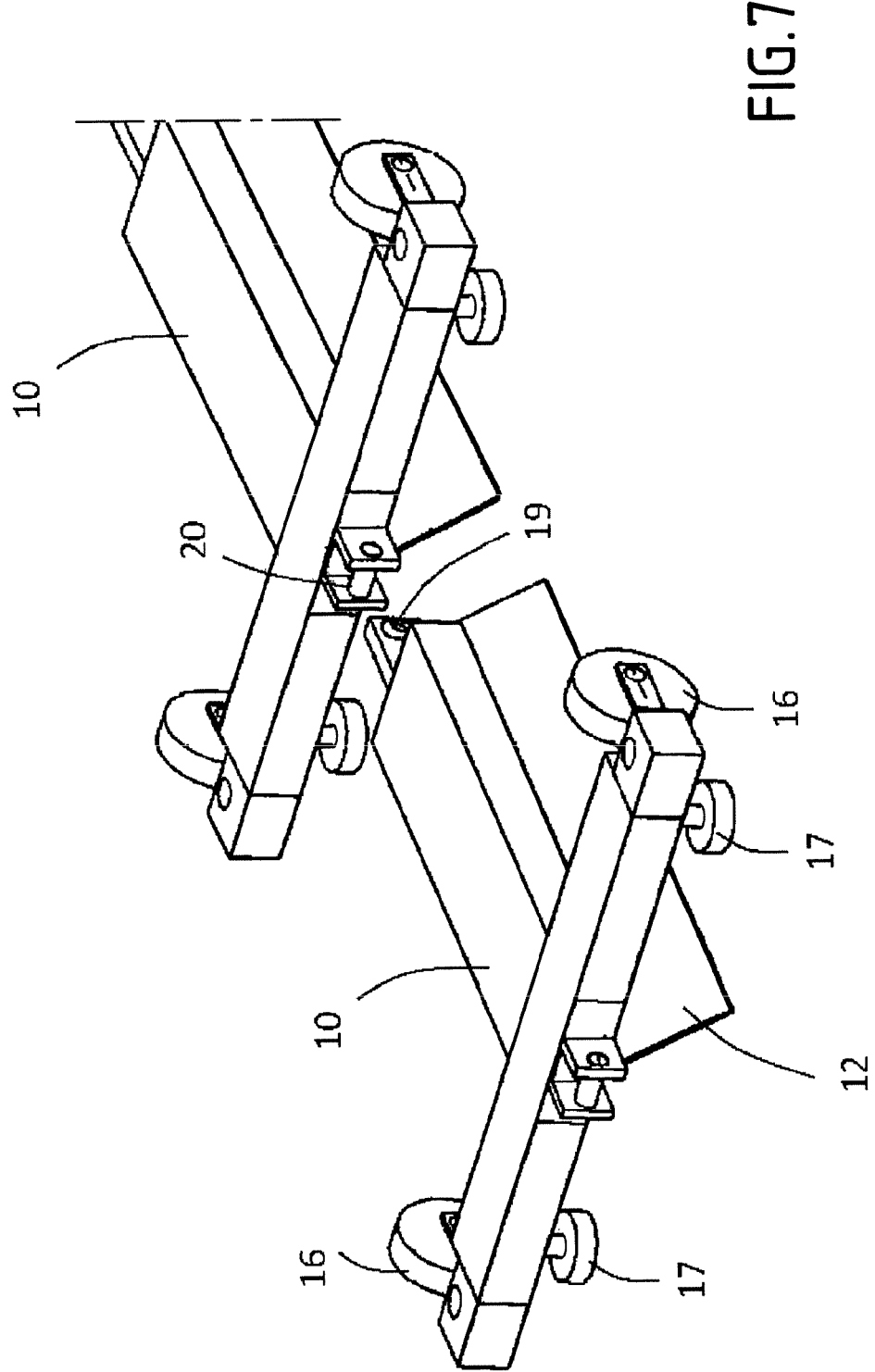
FIG. 7 represents a coupling system for coupling the carriages.

The carriages are connected together by a spherical link 19 and a hinge 20, shown in FIG. 7, which permits corresponding movement between the carriages in all the directions. Thus the train of carriages, equivalent to a chain with regular pitch, can perform turns on the horizontal plane and on the vertical plane, to follow the installations that are often very complex and adapted to the building, with changes of height.

On the carriages 10, orthogonal conveyor belts 8 are installed that constitute sorting cells equipped with an individual motor, with the corresponding control, ready to receive motor activating and speed control commands coming from the central control system 22 of the sorting machine.

Figure 4:
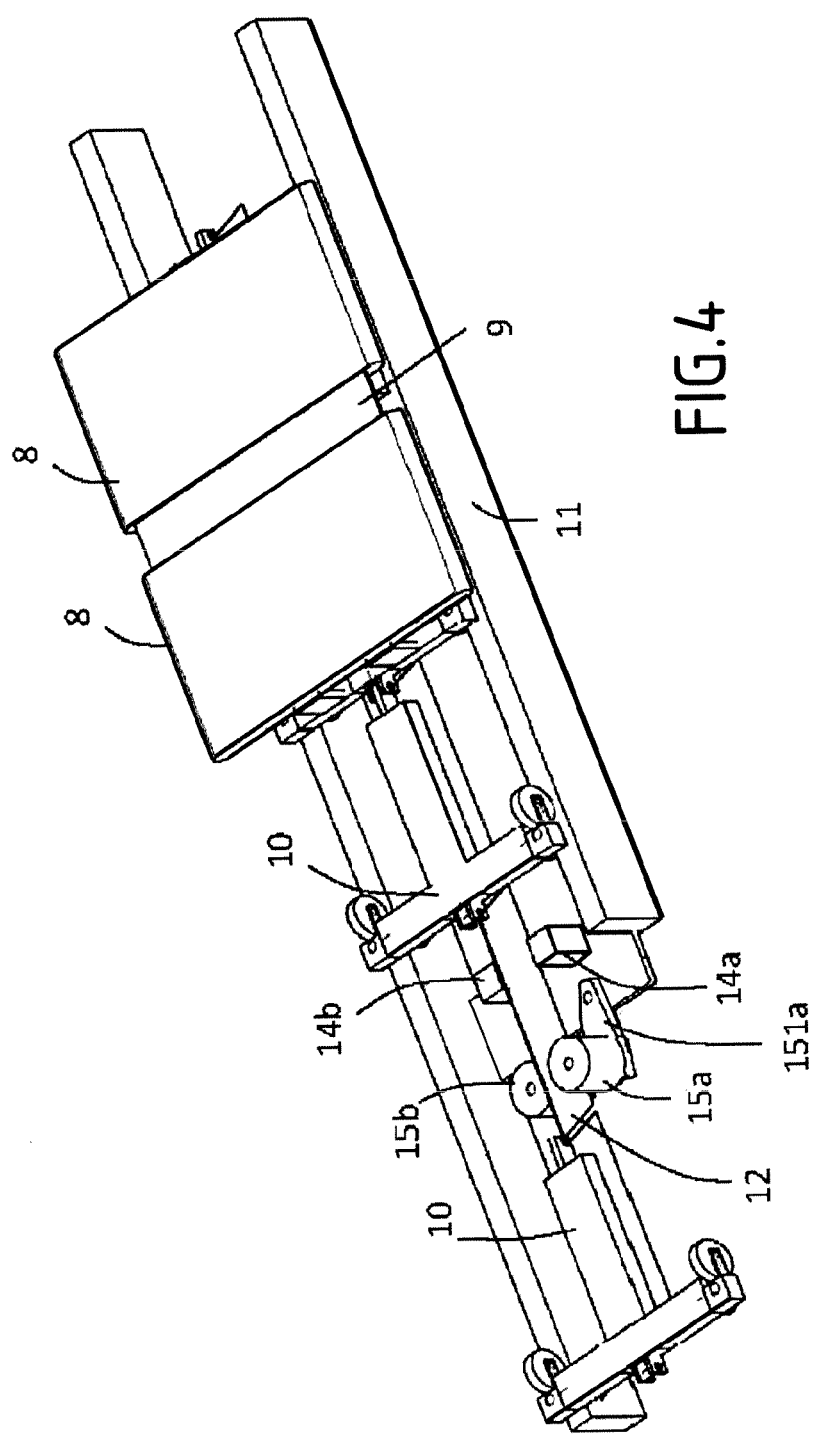
FIG. 4 is a schematic representation of a drive system for driving carriages.
Figure 5:
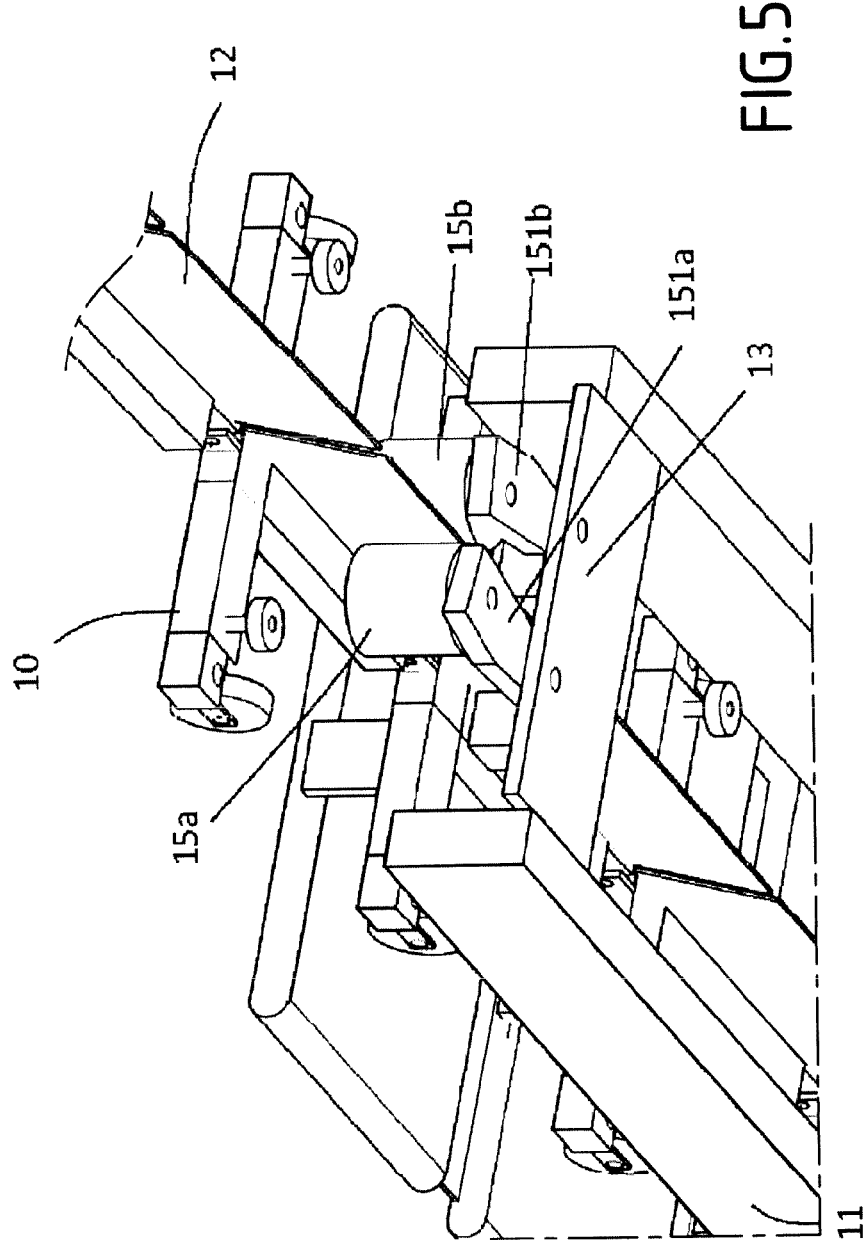
FIG. 5 is a bottom view of a drive system for driving carriages represented in FIG. 4.

The belt 8 is activated to receive in an active manner the packages during loading, to perform possible corrections to the positioning of the packages after loading to improve precision, and lastly to sort the packages that have reached destination. Between the sorting cells, a closing board 9 is provided that penetrates the side of the adjacent cell so as to offer a closed surface even in the circuit curves, in order to prevent the movable parts of the items 7 causing mechanical interference in the bends. As illustrated in FIGS. 4 and 5, driving the sorting machine is for example assured by friction drive units 13 situated along the path of the machine, in particular following the technology arising from the solution of patent EP1352859. The drive unit 13 acts on the vertical laminas 12 of the carriages 10 owing to two large opposing counter-rotating wheels 15a and 15b that act on the two sides of the lamina 12 of the carriage.

The wheels 15a and 15b are pressed against the lamina 12 owing to a spring (not represented). The pressure exerted is sufficient to ensure that the wheels can push the lamina 12 tangentially without slipping at the applicable maximum torque value. Each wheel, 15a and 15b, is supported by an independent jointed arm 151a and 151b, such that the two wheels 15a and 15b can adapt to the imperfections and alignment faults of the laminas 12. In addition, the wheels 15a and 15b can move away from the lamina in the event of the presence of parts of deformed lamina or laminas, overcoming the elastic reaction. This solution makes the eventuality of dangerous mechanical interference for the operation of the machine extremely improbable.

As FIG. 5 shows, the wheels 15a and 15b have large dimensions and great thickness, to ensure the continuous transit of the laminas 12 without shocks and without noise. Owing to the oblique cut of the laminas 12 situated under the carriages, the great thickness of the wheel enables the transit of the laminas between the wheels to occur without interruption: when the rear end of a lamina is about to leave the thrust group, the front end of the following lamina is already engaged between the two wheels 15a and 15b.

Each wheel, 15a and 15b, is activated by drive belts (not represented) driven by a heavy-duty synchronous motor, 14a and 14b. The central control system 22 controls motor torque, regardless of speed, by limiting maximum torque to the value below the skid limit caused by the elastic load of the wheel 15a and 15b on the lamina 12.

The drive belts enable another maximum torque limit to be set, which is necessary in conditions in which a mechanical malfunction would occur at the level of the motor or the drive. Let us take, for example, the braking torque exerted by a motor subjected to internal mechanical seizing due to the failure of a bearing. Even this motor malfunction cannot affect the operation of the sorting machine, because the drive belts of the toothless parallel groove type permit sliding when the torque exceeds the limit value defined by preloading.

The drive groups or drive units 13 are distributed along the path of the machine in an appropriate number for offering redundancy, such that the operation of the sorting machine is totally tolerant of the possible malfunctions that could affect the drive groups.

Figure 9:
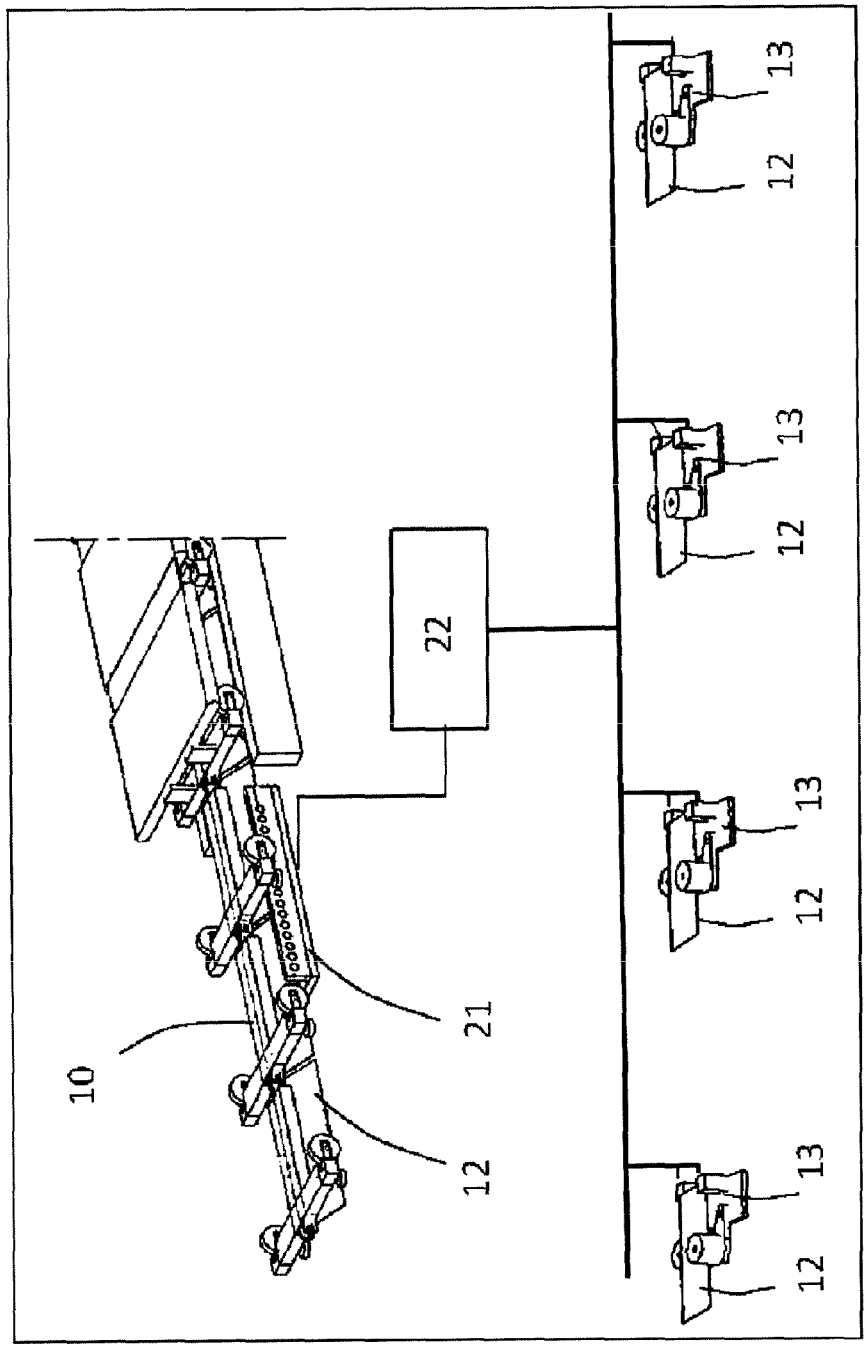
FIG. 9 represents a control system linked to the thrust units.

As represented in FIG. 9, each drive is controlled directly by the central control system 22 of the sorting machine. The latter performs in a centralised manner an automatic function of adjusting the speed of the machine, using the signals that are produced by a sequence of photocells 21 that detect the advance of the laminas 12 of the carriages 10, in order to obtain feedback information on the actual current speed of the machine.

The centralised control of the speed consists of a proportional, derivative and integral algorithm executed cyclically at regular intervals of time. As an output it provides the adjusting command corresponding to the required current torque value, thus the total thrust required of the drive groups. The torque command is communicated to the actuators of the drive motors in a message with an address transmitted cyclically via the industrial computer network 23 for real-time control of the instruments, or "fieldbus", by the control system 22. The torque provided by the motors, 14a, 14b, and thus the thrust on the laminas 12 of the carriages is thus controlled by the actuator, adjusting the current in the coils.

As a general rule, the total required thrust is divided equally between all the drive groups 13. Accordingly, the same instantaneous torque value required by the adjusting algorithm is communicated to all the drive groups 13, such that the thrust values distributed all along the machine are equal and that no accumulation of tension is produced in the chain constituting the sorting machine.

The present invention exploits the possibility of individual control of the thrust value provided by the dedicated thrust units 131 that are added along the sections on a slope P of the sorting machine, so as to be able to cancel partially or completely the tension value of the chain accumulated by the effects of the gravity that acts on the carriages 10 in the sections on a slope. Owing to this invention, it is thus possible to make sorting machines that are capable of overcoming considerable changes in level without this having to entail great oversizing and limiting the durability of the components because of great alternating strains along the path of the machine.

Considerable changes in level lead to very high tension values inside the jointed chain constituting the sorting machine. The forces and the moments acting between the carriages are determined by the tension values, and they change value along the path from the highest level to the lowest level, creating great alternating strains that affect negatively the durability of the components, and which should accordingly be avoided.

Figure 6:
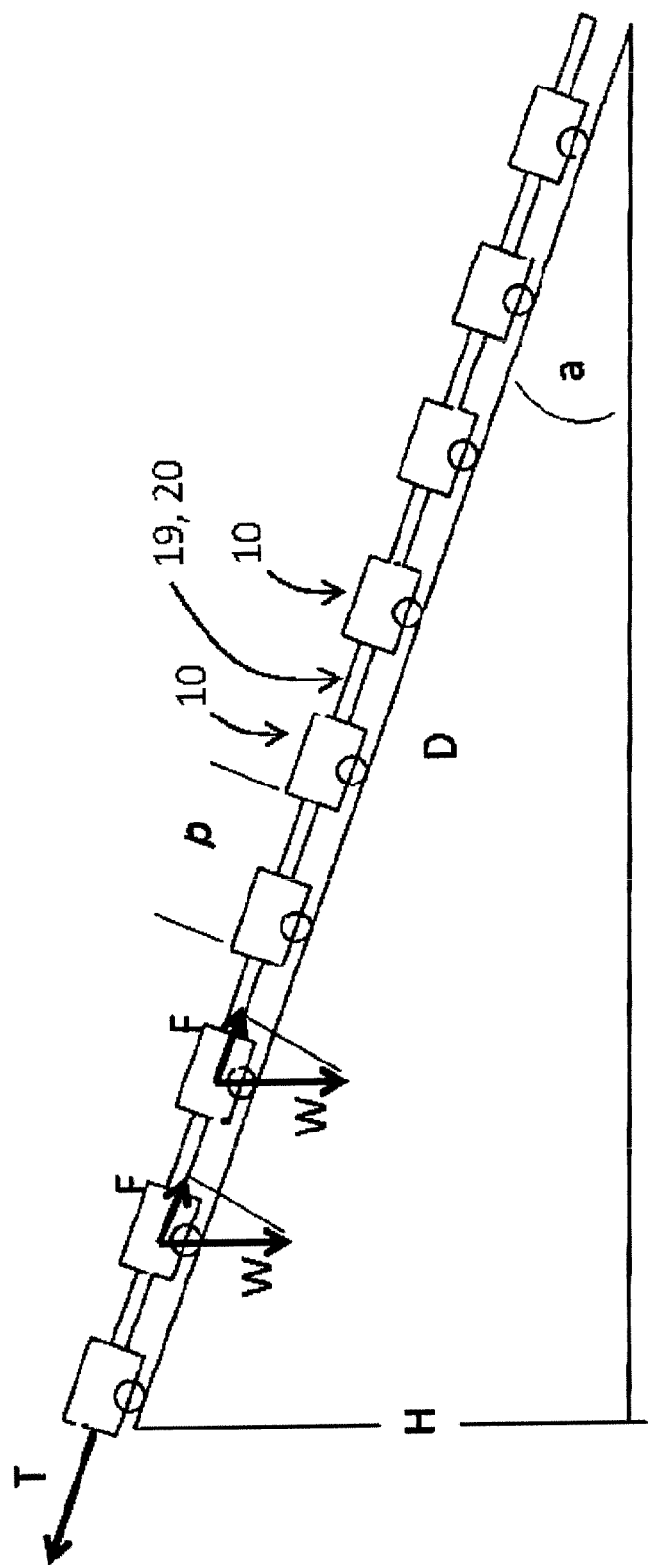
FIG. 6 represents schematically the forces present on the carriages in a slope.

FIG. 6 illustrates the value of the tension T, or of the compression T, acting on the connection members between the carriages 10 due to the weight of the carriages 10 situated along an ascending or descending path. For example, with a change in level of a height H of 8 meters, if a number N is considered of carriages 10 present on the distance D having a pitch p of 0.7 meters and having a total weight W of 80 kg, a package placed on the carriage weighing 15 kg, a slope P of an angle $\alpha$, and gravity acceleration of g=9.81 m/s$^2$, the tension T takes the value of:

$$T = H \times \frac{w}{p} = 8 \times \frac{80 \times 9.81}{0.7} = 9140 \ N.$$

The formula is the result of the following reasoning:
$F = W \cdot \sin \alpha$
$T = N \times F$, where F is the resulting value of the tension or the compression of a carriage, $$N = \frac{D}{p}$$

$$D = \frac{H}{\sin \alpha}$$

thus $$T = H \times \frac{W}{p}$$

These are very high values that involve great oversizing of the connecting members between the carriages, and the inevitable reversal of the forces acting on the carriage along the path are such that they entail a reduction in durability by fatiguing components.

On the other hand, in the case of a path without a change in level, the sorting machine is tensioned to a sufficient minimum value in order not to permit reversal of the forces that act between the carriages at the transit on the drive groups 13.

In a practical case of a sorting machine according to the prior art, a drive group can exert a maximum thrust on the lamina of the carriage that is equal to 1000 N. Accordingly, the envisaged tension of the linked chain is normally around 1000 N, by adjusting appropriately the pitch between the carriages, such that the tension between the carriages does not suffer a reversal at the transit on a drive group.

It is clear that, in the event of a change in level of 8 meters, the carriages of the sorting machine according to the prior art would encounter loads of a higher order of magnitude, and further of alternating tensile and compression type. In certain positions the connecting elements between the carriages would be subjected to great alternating bending moments.

Figure 10:
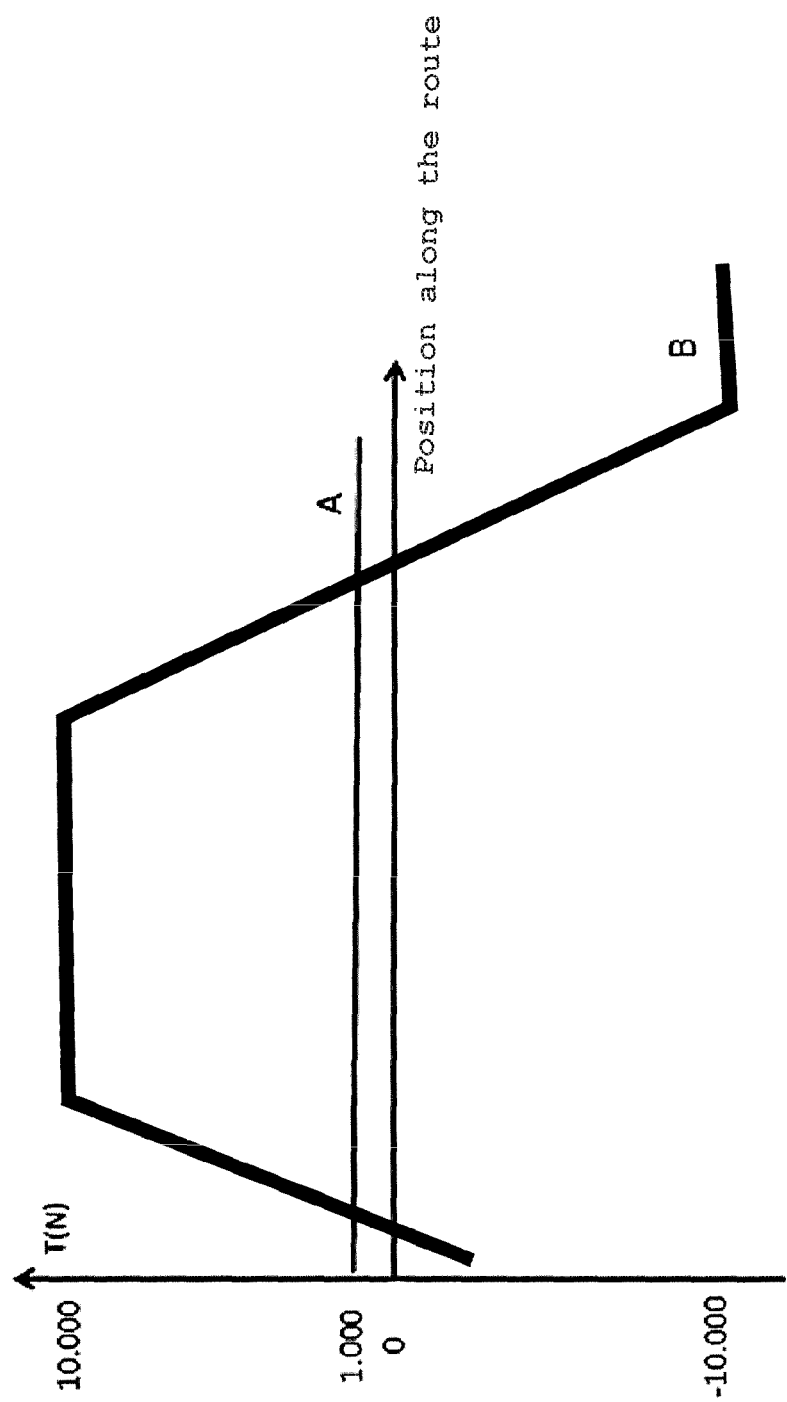
FIG. 10 is a graph summarising an example of the tension encountered by a carriage along the path of the sorting machine.

FIG. 10 shows in a concise manner a graph that shows on the y axis the value of the tension encountered by the connecting members of a carriage along the length of the path of the sorting machine, measured along the x axis.

It shows the comparison between the tension A acting on the carriage in a sorting machine running flat and the tension B in a machine where there are changes in level of about 8 m. In the case of the sorting machine running flat, tension A is indicated as a constant. In reality, there are short transitory changes with variations comprised in a range of 2000 N around the constant tension value, which are not indicated on the graph and which are due to the transit on the drive units 13. This phenomenon is found, at a more or less marked level, in the case of the drive units placed on the sloping circuit sections.

In the case of a machine with height changes, when the carriage travels along the ascending portion, the tension B increases progressively because of the gravity that acts on the carriages that follow, up to a maximum value of about 10000 N, then the latter remains almost constant. Along the descending section, the carriage sees tension decrease then take on negative values corresponding to the compression exerted by the weight of the carriages upstream on the descending section. Various components of the carriage are subjected to the effect of high tension values.

Figure 8:
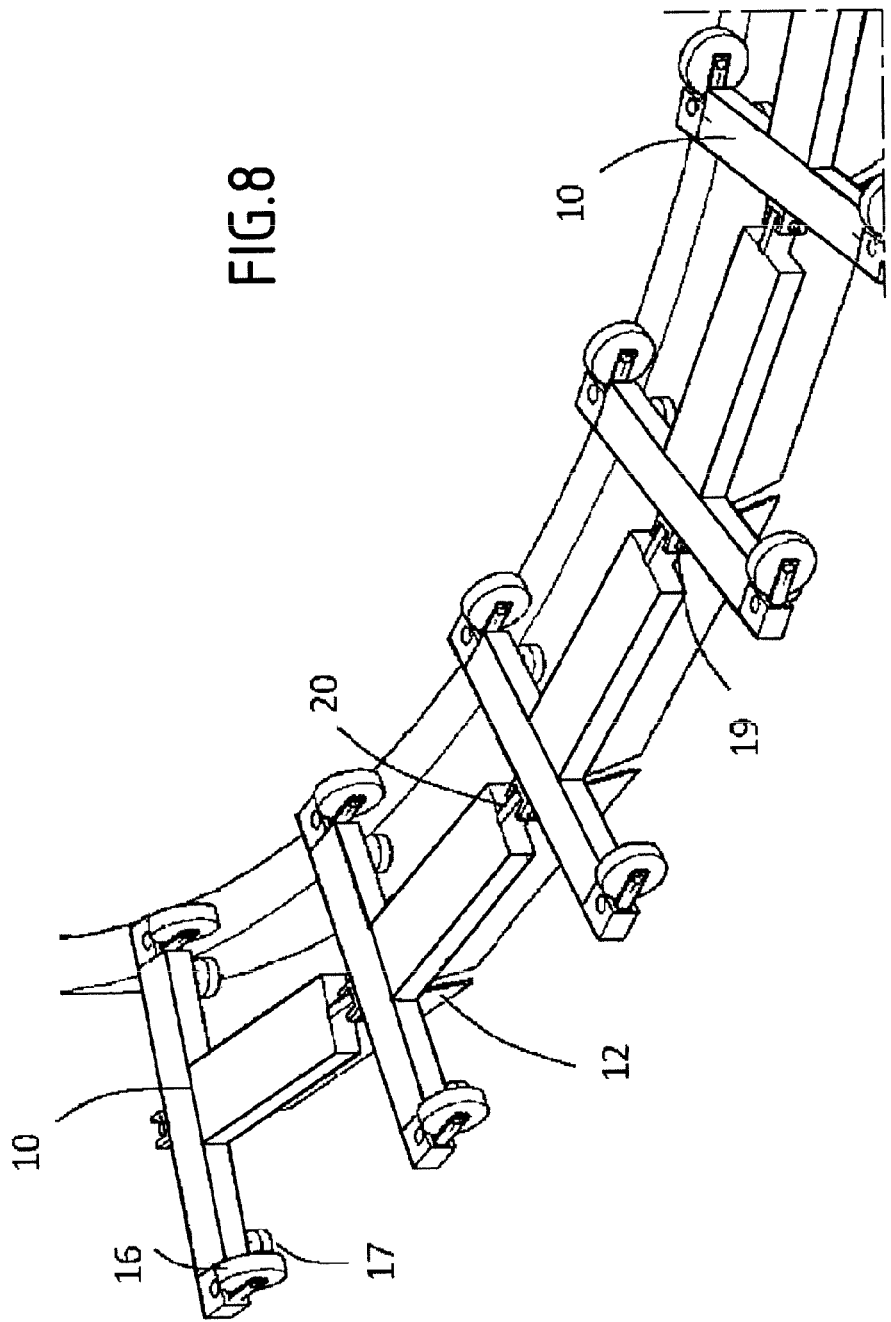
FIG. 8 is a partial view of a bend on a travel route.

At the bends near the ascending sections or descending sections, as FIG. 8 shows, the angle formed between the carriages means that the tension causes a lateral force component acting axially on the link 19, 20 of FIG. 7.

Alternating heavy axial loads on the links affect the durability of the latter, which are more tolerant with regard to great radial loads.

The axial force is proportional to the value of the tension, it is thus clear that there is an interest in reducing the total value of the tension acting on links 19 and 20 of the carriages.

Further, as FIG. 8 shows, at the bends the side guide wheels 17 are subjected to compression against the side of the rail 11 with a value that is proportional to the tension. The compression of the side guide wheel 17 at the bends increases with the angle formed by the polygon of the carriages in the bend and is proportional to the tension value. Depending on the curvature radius used by the machine, the compression of the wheel 17 can be equal to about 25% of the tension value. If the case of the carriage of the prior-art sorting machine mentioned above is considered, the side guide wheel 17 would be subjected to a pressure of 2500 N, a very high value that would greatly reduce the durability of the cladding and the bearings.

The connecting links 19, 20 between the carriages are also subjected to alternating bending moments that are proportional to the tension at the bends.

Similarly, the supporting castor wheels 16 are subjected to great compression on the track or against the retaining device on the track, which is not shown in the Figure, at the positions where the slope P changes. Also in this case, the compression value is proportional to the tension value in the chain. In view of the high frequency with which the wheels pass on the track, in the positions where the tracks are submitted to the great compression exerted by the wheels, they also are subjected to problems of fatigue durability and also wear.

The present invention permits solutions for cancelling the tension caused by the gravity that acts on the carriages in the sections on a slope P. With these solutions, it is thus possible to link the evolution of the tension, encountered by the carriage along the path, from a curve B to a curve A as shown in the graph of FIG. 10, whatever the variation in level necessary for the sorting machine.

The invention relates to both the dynamic and static behaviours of the machine. Dynamically, the cancellation of the tension and of the effects thereof during the movement of the machine, or the great reduction thereof, enables alternating loads to be avoided that reduce the durability of the components.

In a stationary condition, with the sorting machine not powered, it is also possible to eliminate the tension or compression on the carriages such that it is not necessary to oversize these members to make them withstand major static forces.

Accordingly, to reduce the value of the tension or of the compression, the present invention proposes arranging dedicated thrust units 131 along the ascending and descending sections. The dedicated thrust units 131 can be of the same type as the drive units 13 used for driving the machine and automatic speed control thereof They are dedicated and the torque thereof is controlled with values that are able to exert forces that are capable of cancelling, or greatly reducing, the weight force acting on the carriages, and thus the tension or the compression on the connecting members between the carriages. These dedicated thrust units 131 are suitable for thrusting the carriages by exerting a controllable force, regardless of the speed of the machine. Reducing the tension enables, in a non-limiting manner, oversizing of the carriages and of the connecting members to be avoided and the strains acting on the wheels and on the links to be decreased. The reducing prevents loads and alternating bending moments being produced that affect negatively the fatigue durability of the components of the carriage 10.

Owing to the possibility of controlling one by one the drives of the motors, it is possible to obtain constant forces acting on the laminas 12 of the carriages 10, in such a manner as to oppose the effects of the weight force. Thus several dedicated ascending and descending thrust groups 131 can be distributed, each for cancelling the component of the weight force F relating to a group of carriages. It is necessary for each dedicated thrust group 131 to be able to exert a controlled force regardless of the speed of the machine. In fact, the components of the weight force have to be compensated that do not depend on the speed of the machine, also during the start-up transition time of the machine when the speed of the machine grows with constant acceleration. Further, it is clear that, in the descending sections, to compensate the weight force, the force exerted by the thrust groups has to have the same direction, but in the opposite sense to that of the speed of the machine, whereas in the ascending sections the necessary force has the same directions and senses.

In order to determine the thrust value R required for each group, the average value can be used of the weight of a carriage by considering the carriage to be loaded with a package of average weight equal to 15 kg. In this manner it will not be possible, in general, to totally cancel the tension or compression value, in view of the randomness of the loading of the carriages. Nevertheless, the total value of residual tension will be reduced drastically. The average weight of the items can be given following a statistical study of the flow of items 7 during use of the studied installation. The user of the installation can also consider a distribution of the weights of parcels to calculate the average weight of a parcel. The average weight of the items 7 can also be determined in real time by recording the weight of the items present at an instant t on the travel route 1. The weight of each item is given by the weighing belt of the tunnel 6. In the event of an absence of a weighing function, the tunnel 6 can be provided to detect optically the weight declared and indicated on the items, or also, obtain this information from a database after identification of the items.

On the other hand, the invention enables the tension or compression value to be totally cancelled by modulating the thrust of the dedicated thrust groups 131 according to an algorithm knowing the effective weight of each carriage 10 present in the section on a slope P. It is already very common, in package sorting applications, for the weight of each object 7 loaded on the sorting machine to be determined during loading and in particular during the transit on the weighing bands at the level of the tunnel 6.

Inasmuch as the weight of the object possibly present on the carriage is known, the control system 22 of the sorting machine knows at each instant the position of each carriage at the sections on a slope P and also the effective weight of each carriage 10.

It is thus possible to calculate the value of the force R required for each drive group situated in the section on a slope P that is necessary for totally cancelling the tension or the compression value due to the effect of the gravity acting on the carriages, even in unlikely situations where many heavy packages would be on the carriages of the same section of path on a slope. In this case, tension or compression is constant, whatever the change in level requested of the sorting machine. The representation thereof on the diagram of FIG. 6 would be identical to that of the tension A corresponding to a horizontal circuit.

Figure 11:
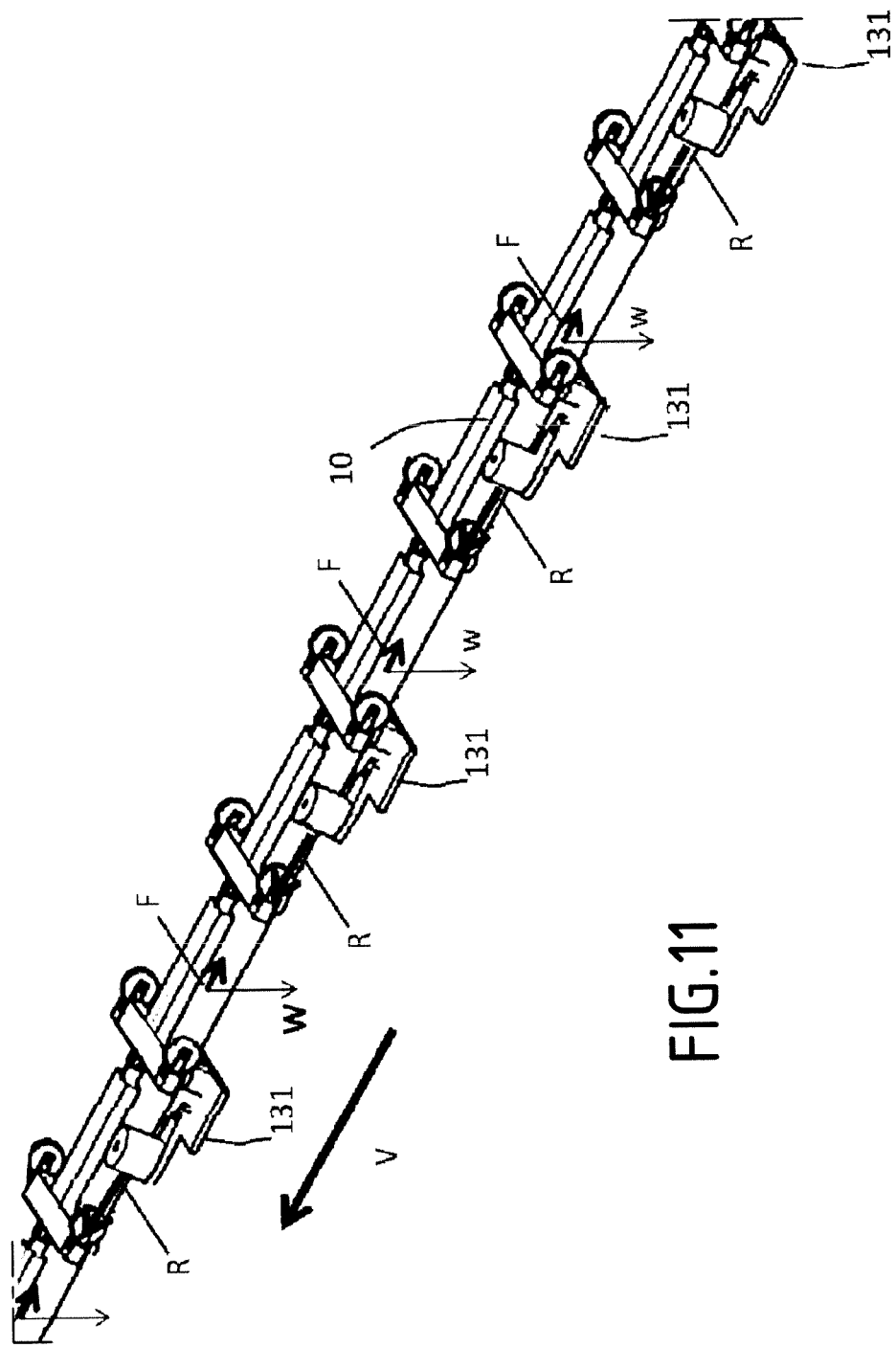
FIG. 11 represents schematically the forces exerted on the carriages on an ascending slope by the thrust units dedicated to cancelling the weight of the carriages according to an exemplary embodiment of the invention.
Figure 12:
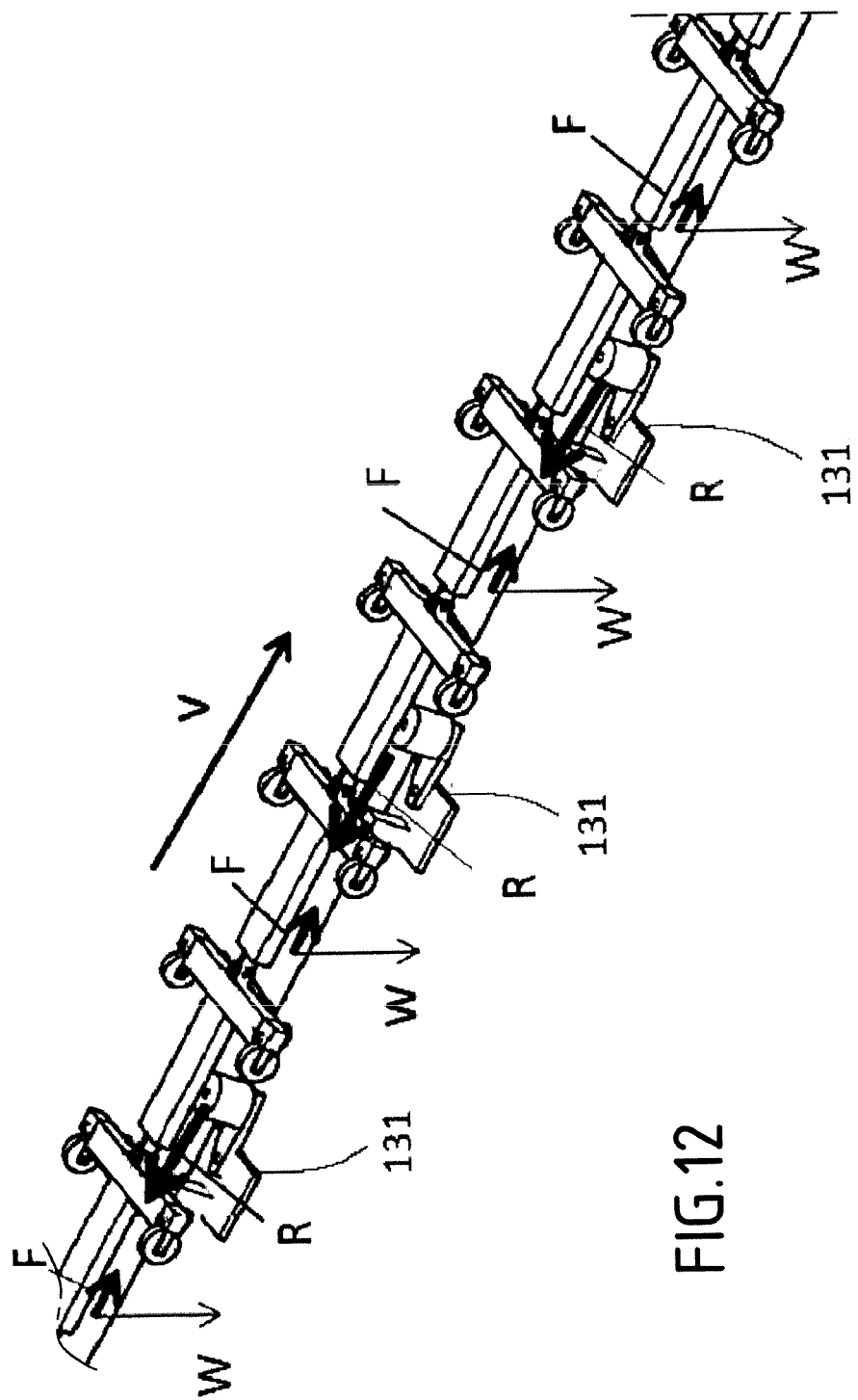
FIG. 12 represents schematically the forces exerted on the carriages on a descending slope by the thrust units dedicated to cancelling the weight of the carriages according to the same exemplary embodiment of the invention.

FIGS. 11 and 12 show the implementation of the solution. In FIG. 11, which represents an ascending portion, the dedicated thrust units 131 receive a torque command that engenders a thrust corresponding to a complementary force R in the same direction and in the same sense as the movement of the machine, such as to cancel the components that are parallel to the tilted plane and engendered by the weight force W acting on the groups of carriages 10. FIG. 12 represents a descending section. In this case, the dedicated thrust units 131 receive a torque command that engenders an opposite thrust to the travel sense of the sorting machine, such that the command cancels the components of the weight force along the tilted plane. This is possible, as already said, when the torque of the motors of the dedicated thrust units 131 are controlled, regardless of speed and rotation sense.

The following non-limiting example will enable the different forces to be understood better that are represented in FIGS. 11 and 12. A sorting machine having a change in level of 8m with a slope of 12° makes 48 movable carriages 10 circulate at a pitch distance of 0.8 m on the slope that is 38.4 m long. The weight of each carriage 10 is 85 kg, including the average weight of the conveyed item 7. According to the aforementioned formula $F=W \cdot \sin \alpha$, the force F of each carriage is equal to 17.6 kg. The tension generated at the top of the slope would be equal to 17.6×48 carriages=845 kg, in the absence of the invention.

In one implementation of the invention in the above example, we choose to install 24 dedicated thrust units 131 on the slope. Thus each dedicated thrust unit 131 has to manage the weight of 2 carriages 10 situated on the slope, as represented in FIGS. 11 and 12. In this exemplary embodiment, there are no drive units 13 implanted on the slope because the latter are not necessary to ensure the driving of the carriages 10. In fact, in this example, the drive units 13 placed upstream and downstream of the slope suffice to ensure the driving of the carriages 10. The ratio of the number of carriages 10 to the number of dedicated thrust units 131 is not restrictive and can be modified according to the technical strains borne by the dedicated thrust units 131. Assuming for the sake of example that the weight of the carriages 10 is constant, each dedicated thrust unit 131 will have to generate a force R of 2×17.6 kg or 35.2 kg to compensate for the tensions due to gravity. In this example, with a practical case of a dedicated thrust unit 131, of the same type as the drive unit 13, which is capable of producing a maximum force of 100 kg, only 9 dedicated thrust units could be used. Nevertheless, in this case the strain exerted on the connecting links 19, 20 between the carriages would be greater because each dedicated thrust unit will act on a complex of five carriages rather than two. In the case of exact knowledge of the weight of each carriage, the force R delivered by the dedicated thrust units 131, to cancel total tension, is adjusted dynamically.

In the case of a descent with parameters symmetrical to the above parameters, illustrated by FIG. 12, each dedicated thrust unit 131 on the slope develops a force R that compensates the sum of the forces of gravity that are applied to the carriages that are taken in hand by this thrust unit. In the example of FIG. 12, this force R is equal to 2×F with the assumption that F is constant, regardless of what the carriage 10 is. In this case, the force R is generated opposite the direction of the travel route 1. The dedicated thrust units 131 are capable of generating this force R, which is requested by the control system 22, regardless of the speed and travel sense of the sorting machine.

Until now, the dynamic behaviour, i.e. the cancellation of the tension caused by gravity during the movement and operation of the sorting machine by the appropriately arranged and controlled dedicated thrust groups has been considered.

Let us now consider the solution for the stationary aspect, when the sorting machine is stopped and there is no electric power supply or with the machine in movement when the sudden interruption of the electric power supply occurs because of the tripping of the emergency circuits or because of problems of electricity distribution.

In the event of an absence of electric power supply, the drives of the dedicated thrust groups 131 are no longer able to exert the forces necessary for cancelling the tension as disclosed above. In this case there would thus be a maximum tension value determined by gravity acting on the carriages as a static load. Further, in the case of very imbalanced loads, when the sorting machine stops in an emergency in a condition where there are many heavy packages on the carriages in the ascending portion, great strains are produced on the castor groups of the support wheels 16 that are due to the tendency of the sorting machine to go backwards.

Thus even if the dynamic case had been resolved, the stationary case would in any case require oversizing of the carriages 10 and of the corresponding components in order to be able to withstand the static loads influenced by gravity.

The invention also enables the stationary tension to be eliminated that is due to gravity, also in cases in which the sorting system is no longer powered electrically. The solution proposed by the present invention provides for the motors of the dedicated thrust groups 131 situated on the sections on a slope being provided with active de-energised electromagnetic brakes.

These brakes are currently available as accessories of the motors. They essentially take the form of a friction brake disk that is maintained separated from the rotor of the motor by a solenoid valve through which electric current passes. In the event of a drop in the supply voltage to the actuators, the solenoid valve no longer opposes the force exerted by an elastic element that presses the brake disk against the rotor. When the motors are braked, rubbing forces are created that act on the laminas of the carriages, which are greater than the forces produced by the motors in the active phase, and which are still in an opposite direction and sense to the movement of the machine, and are designed to compensate totally the components of the gravity acting on the carriages 10, which thus cancels the tension value.

By using the standard configurations of the conveyor belts of cross-belt type, the tilt limit of the slopes is generally about 12° because of the stability of the conveyed objects. This maximum tilt can be exceeded by adding stabilising means for stabilising the conveyed items.

Supposing that the exact weight of each item 7 loaded on the carriages 10 is known and is used, according to the invention, to compensate entirely the tension or compression, there is accordingly no acceptable limit height for the travel belt 1. On the other hand, if the weight is not exactly known and an average weight is used to determine the force R compensating the tension or the compression, there will be a theoretical maximum height that will be connected to the difference between the actual item weights and the estimated weights thereof and to the general features of the machine, particularly the mechanical resistance of the connecting members between the carriages. Let us take the example of an average item weight of 15 kg and of a maximum item weight of 50 kg. In practice, the maximum, and already significant, reachable height, will be about 16 m in the worst case where all the items 7 present on the slope have a weight of 50 kg, taking account of the technical features of a typical carriage of an item sorting machine of cross-belt type.

The above disclosure of the solutions relating to the present invention refers to sorting machines of cross-belt type or tilt-tray type or to other similar machines, consisting of a chain where the links are carriages 10 with corresponding drive groups 13 based on articulated friction wheels. Naturally, this solution also applies to other sorting machines with other types of drives, provided that the latter are distributable along the path of the sorting machine and enable directly controllable propulsion or braking forces to be exerted. Different technologies are available, such as linear technologies without induction contact, linear technologies without synchronous contact, whilst maintaining the possibility that the thrust of each group can be controlled regardless of the speed of the sorting machine.

Figure 13:
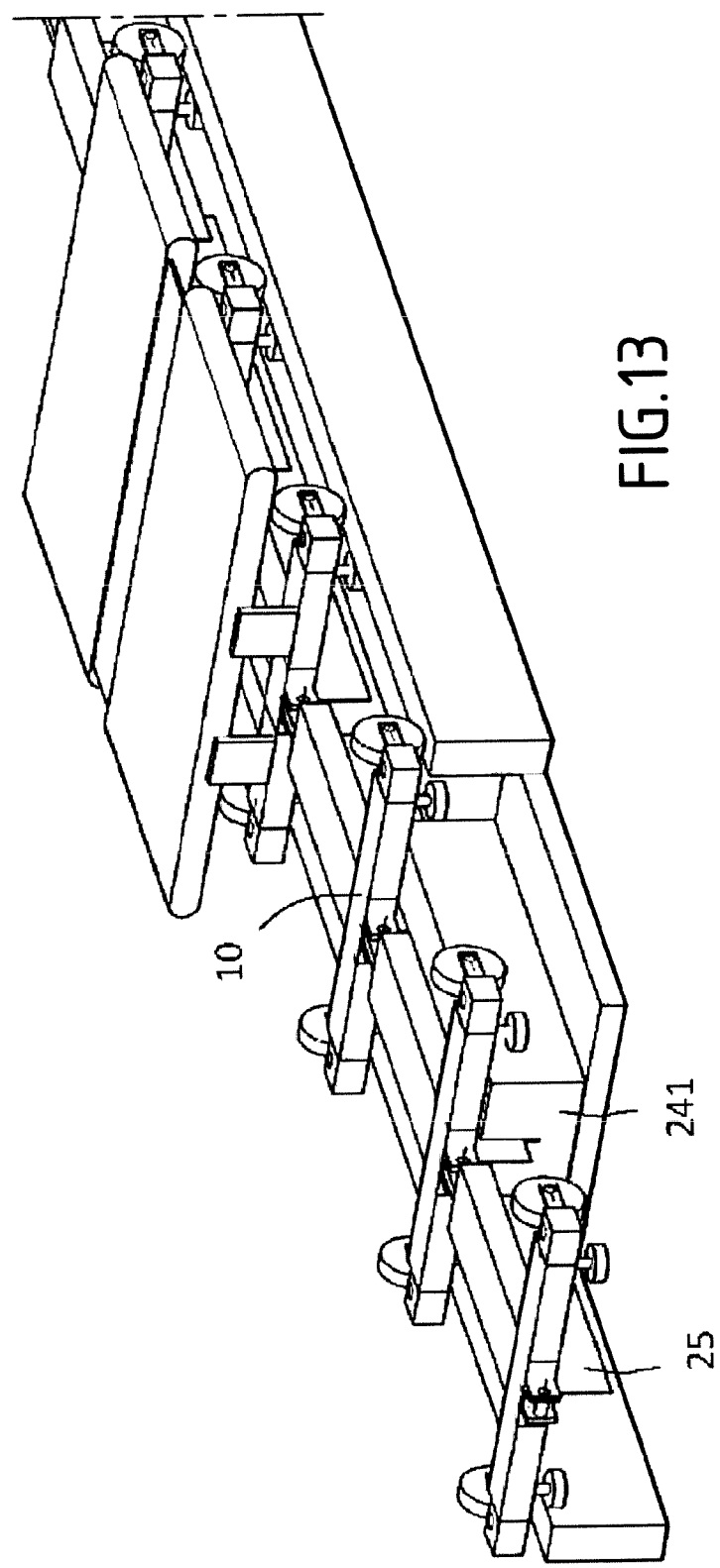
FIG. 13 is a representation of an implementation according to the invention with a first type of dedicated thrust units without contact.

For example, magnetic induction powertrains, shown in FIG. 13, can be used that are capable of thrusting without contact aluminium vertical laminas 25 situated under the carriages. In the most common version with opposite stators 241, the lamina 25 situated under the carriages moves into a narrow cavity between the stators. The stators are powered by three-phase alternating voltage, and the stator coils are so connected that the three-phase voltage produces a magnetic field migrating along the direction of movement of the machine. The magnetic field, which traverses the lamina 25 at a higher speed than that of the lamina 25, induces currents there that create secondary magnetic poles, such that the laminas 25 of the carriages 10 are driven by the magnetic field migrating from the stator 241, to oppose the magnetic flow variations in the conducting paths of the laminas.

In this manner, whilst the laminas 25 of the carriages 10 move into the cavity of the stators 241, the laminas 25 are subjected to a propulsion force the value of which can be adjusted by varying the frequency of the three-phase voltage in the stators, to vary the difference between the speed of the migrant magnetic field and the speed of the laminas 25 of the carriages 10.

Thus, using such powertrain groups, it is possible to use the solution according to the invention, similarly to what has been disclosed previously, in order to control individually the drive groups, and the dedicated thrust units 241, and obtain variable thrust values as this is required for adjusting the speed of the sorting machine, or constant thrust values, at the groups installed along the paths on a slope, to engender forces opposing the components of the gravity forces that act on the carriages 10, in such a manner as to cancel the tension or compression value in the chain constituted by the carriages 10.

For the same purpose, other types of induction powertrains can be used that have been recently introduced on the market that differ from previous types through greater efficiency, because the migrant magnetic field is engendered directly by the rotation of two plates equipped with alternating magnetic poles between which the laminas 25 conducting the carriages pass.

For the present invention, the synchronous linear drive for sorting machines, another system for driving without contact, can also be used. Shown in FIG. 14, the synchronous linear drive comprises permanent magnets 27 arranged in alternating magnetic poles and at regular intervals under the carriages 10, driven by the magnetic field produced in the stator coils of the powertrain group 261. The powertrain 261 on the ground comprises sensors for determining the instantaneous position of the magnets 27 situated under the carriages, such that driving the synchronous motor can engender propulsion or braking forces of controllable intensity, as required by the invention.

Using linear induction dedicated powertrains 261 or synchronous linear powertrains, arranged on the sections on a slope and suitably controlled, enables the components of the gravity forces acting on the carriages to be compensated actively, and thus the value of the tension or of the compression to be cancelled only when the sorting machine is powered electrically.

In order to reduce the static forces engendered by gravity when the sorting machine is not powered, braking wheels (not represented) are added to the linear powertrains situated on the sections on a slope. The braking wheels are preloaded in such a manner as to act on the carriages 10 or on the laminas of the carriages 25, and are provided with active de-energised electromagnetic brakes, as this is made more simply in the solution with the drives of the sorting machine shown in FIGS. 4 and 5.

The invention claimed is:

1. Item sorting system comprising movable carriages (10) intended for conveying items (7) and connected together by a link (19, 20) along a travel route (1) having sections situated at different elevation levels connected by one or more ascent and descent slopes (P), a control system (22) and drive units (13) intended for advancing the carriages (10) and controlled by the control system (22), characterised in that it comprises at least one dedicated thrust unit (131, 241, 261) separate from the drive units (13), present on at least one of the slopes (P), and controlled in a unitary manner by the control system (22) so as to deliver a force (R) to reduce or cancel the tension or the compression to which the carriages (10) are subjected at the level of the links (19, 20) which would be due to the weight of the carriages (10) and/or of the items (7) present on said slope (P).

2. Sorting system according to claim 1, wherein the at least one dedicated thrust unit (131, 241, 261) is controlled by the control system (22) such that the force (R) delivered is adjusted according to the tilt of the slope (P).

3. Sorting system according to claim 1, comprising means (6) suitable for determining the weight of the items (7) placed on the movable carriages (10) and in that the at least one dedicated thrust unit (131, 241, 261) is controlled by the control system (22), such that the delivered force (R) depends on said weight.

4. Sorting system according to claim 1, wherein the at least one dedicated thrust unit (131, 241, 261) is equipped with an electromagnetically tripped braking system.

5. Sorting system according to claim 1, wherein the at least one dedicated thrust unit (131, 241, 261) is equipped with at least one motor having an electromagnetic brake.

6. Sorting system according to claim 1, wherein the at least one dedicated thrust unit (131, 241, 261) uses friction or linear mechanisms without induction contact or linear mechanisms without synchronous contact.

7. Item sorting method by a sorting system according to claim 1, characterised in that the control system (22) determines the value of the force (R) required for the at least one dedicated thrust unit (131, 241, 261) and controls in a unitary manner said at least one dedicated thrust unit (131, 241, 261) such that it delivers the force (R) to reduce or cancel the tension or the compression to which the carriages (10) are subjected at the links (19, 20) due to the weight of the carriages (10) and/or of the items (7) present on the slope (P).

8. Method according to claim 7, wherein, to determine the value of the force (R) required for the at least one dedicated thrust unit (131, 241, 261), each item (7) is assigned an average weight, determined statistically.

9. Method according to claim 7, wherein, to determine the value of the force (R) required for the at least one dedicated thrust unit (131, 241, 261), the actual weight of the items (7) placed on the carriages (10) and determined by a means (6) suitable for determining the weight of the items (7) is taken into account.

10. Method according to claim 7, wherein, to determine the value of the force (R) required for the at least one dedicated thrust unit (131, 241, 261), the tilt of the slope (P) is taken into account.

11. Method according to claim 10, wherein the force (R) calculated by the control system (22) is either positive in the case of a slope (P) with positive tilt to limit the traction on the links (19, 20) or negative in a slope (P) with negative tilt to limit the pressure on the links (19, 20).

12. Item sorting method according to claim 7, wherein, in the event of an interruption of the electric power supply to the at least one dedicated thrust unit (131, 241, 261), the activation of the electromagnetic brake of said at least one dedicated thrust unit (131, 241, 261) cancels the tension or the compression on the links (19, 20) of the carriages (10) present on the slope (P).

* * * * *